United States Patent [19]

Wright

[11] Patent Number: 4,999,032
[45] Date of Patent: Mar. 12, 1991

[54] REDUCING ATMOSPHERIC POLLUTION BY AUTOMATIC PROCESSING OF LEAKING FILTER BAGS IN A BAGHOUSE NETWORK

[76] Inventor: Wade Wright, 4113 72nd. Ave., Hyattsville, Md. 20784

[21] Appl. No.: 516,846

[22] Filed: Apr. 30, 1990

[51] Int. Cl.$^5$ .............................................. B01D 46/02
[52] U.S. Cl. ........................................ 55/97; 55/213; 55/270; 55/300; 55/309; 55/DIG. 3
[58] Field of Search ................. 55/213, 270, 274, 293, 55/300, 304, 309, 97, 341.2

[56] References Cited

U.S. PATENT DOCUMENTS

| | | | |
|---|---|---|---|
| 3,712,114 | 1/1973 | Osborn | 55/270 X |
| 3,865,561 | 2/1975 | Osborn | 55/270 X |
| 4,356,007 | 10/1982 | Bowman | 55/213 |
| 4,618,353 | 10/1986 | Reier | 55/341.2 X |

*Primary Examiner*—Charles Hart
*Attorney, Agent, or Firm*—Laurence R. Brown

[57] ABSTRACT

Automatically operable protection is afforded to eliminate pollution to the atmosphere caused by failure of fabric filter bags in a filter network. This is achieved by increases after bag failure in aerodynamic flow volume of fluid in the flow path to the individual filter bags past a closure valve structure. Critical and rapid response is achieved by an aerodynamic substantially flat plate member pivotably mounted off center to initiate movement toward a closure position. A counterweight on the smaller area side moving toward closure assures closure of the flow path. The valve may be latched close, and may telemeter closure to a central location visible to an operator. For reverse jet type systems the valve is mounted in a fluid output flow path from the filter bags in a location where the reverse jet flow does not pass through the valve. Consistent operation of a plurality of networked valves is assured by locating them in flow path positions having little turbulence. The valve structure may be retrofit by mounting of a thimble at an inlet mouth to the bags, which further serves to limit turbulence at the cuff area of the bags that tends to abrasively wear the bags and cause early failure.

17 Claims, 2 Drawing Sheets

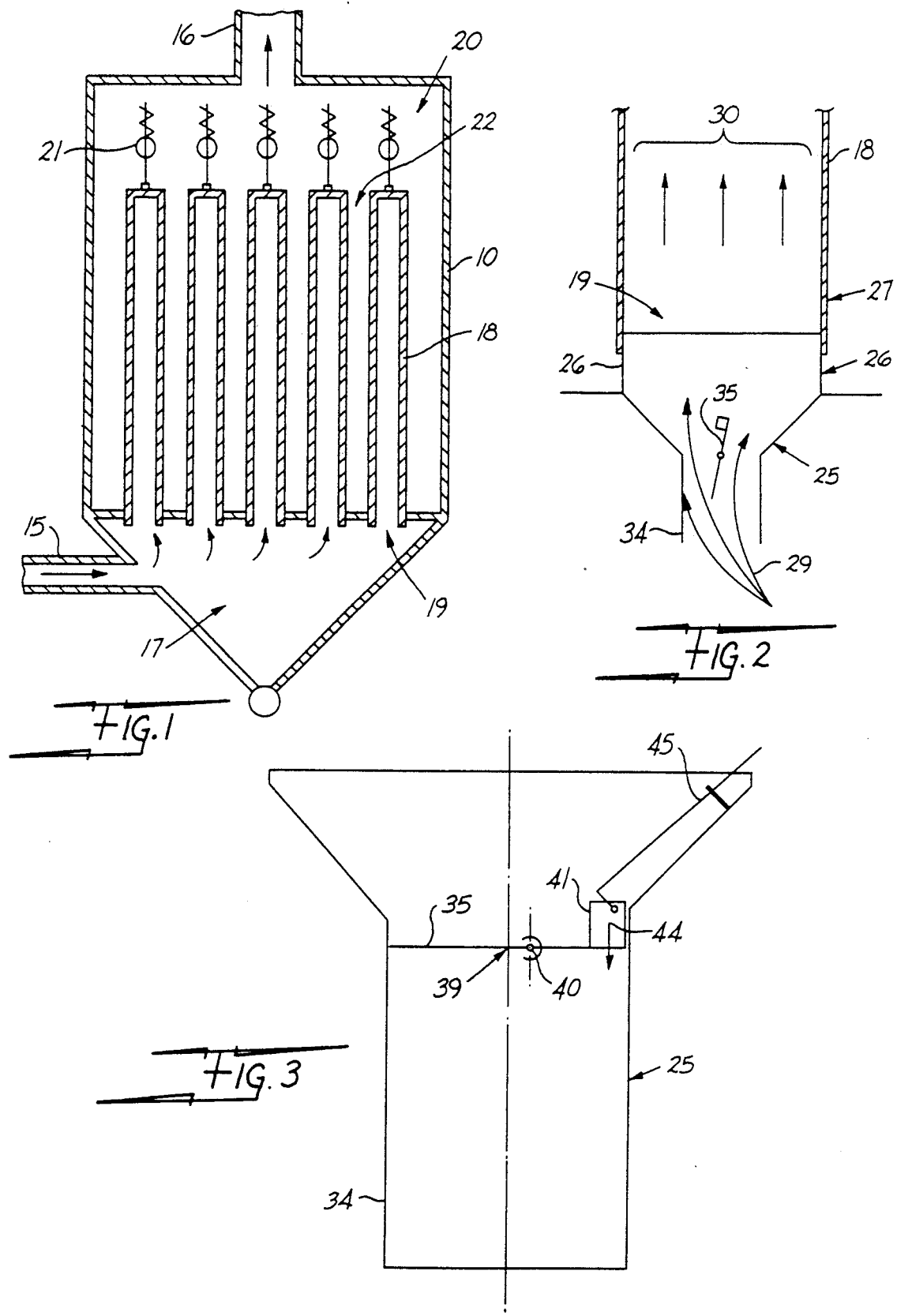

REDUCING ATMOSPHERIC POLLUTION BY AUTOMATIC PROCESSING OF LEAKING FILTER BAGS IN A BAGHOUSE NETWORK

TECHNICAL FIELD

This invention relates to "baghouses" where a network of elongated fabric filter bags are placed in the flow stream of a pollutant fluid such as air for filtering dust and the like to eliminate atmospheric pollution, and more particularly it relates to automated control of the filter bag network for reducing the effect of pollution discharge into the atmosphere when individual bags burst or leak.

BACKGROUND ART

An automatic filter network failure detection and correction system is known in the prior art, namely that disclosed in U.S. Pat. No. 4,356,007 to H. L. Bowman, Oct. 26, 1982. Thus, increased fluid flow through individual filter bags caused by holes in the bag fabric is detected to operate a valving mechanism to close off that individual bag and thus prevent leakage of raw fluid with pollutants into the atmosphere. This invention is related to that general type of detection and correction system.

There are many problems encountered in sensing and controlling bag failures in these "baghouse" filtering systems that have not been recognized or corrected by prior art systems. For example the flow of fluids through filtering systems creates zones of turbulence, eddies, laminar flow, calm and other flow conditions that may be dynamically changing with volume and velocity of flow or be rather static due to flow path characteristics. These flow patterns not only affect the life of filters, but more important they affect, the ability to detect changes in flow volume at particular detector locations, and the ability to use flow volume characteristics to automatically operate vents or valves in automatic control systems. Thus, automatic capping of leaking bags, by sensing and employing changes in flow volume, becomes critical in the presence of variations of operating conditions, which as a practical matter is a necessity in most installations that do not have constantly regulated unchanging flow conditions.

Furthermore because of the necessity to retrofit existing systems for refining improvements as environmental standards become stricter, any automatic system for capping of leaking bags cannot be designed for optimal performance under unknown future conditions. Also, the points of access into the bag systems for installation of sensors and cappers are limited, and tend to be in positions encountering high turbulence such as in plenum areas, and the like.

In some systems, flow changes are so extreme in nature that flow detectors and flow controlling valves may be operated erratically to defeat the purpose of eliminating more pollution. Thus for example, in jet pulse type self cleaning systems, the air flow reverses in direction and involves violent jet pulses or rhythmic vibrations inconsistent with operation of detectors and controllers required for pollution control.

Also the automation of systems is sometimes limited because the controllers are "hidden" in the system in spots that are difficult to monitor so that problems are hard to detect when bags begin to fail. For each bag that is capped off, for example, an additional stress is placed upon remaining bags to handle the flow load. Thus, careful monitoring of the number of capped off bags is essential by monitoring the differential pressure across the compartment. Also dynamic monitoring is desirable to determine the nature, frequency and positions of failures so that related causes may be quickly corrected before the atmosphere is polluted by filter system failure.

Another critical condition under which atmospheric pollution may occur is in the initial installation of new bag filters. The flow of air through new bags tends to be much less restricted until they develop a dust caking that limits flow. Thus flow is diverted from caked bags into a bank or section having new bags, which can result in catastrophic failure or pollution flow into the atmosphere that is normally filtered out by help of the dust caking which builds up in due course.

Furthermore turbulence in flow at the entryway into the bags can cause excessive wear at the bag "cuff" because of concentration of abrasive particles directed toward the fabric rather than in laminar flow paths for which the systems are designed.

Therefore, it is to be recognized that many critical conditions are imposed upon automatic sensing and flow control systems for capping ruptured filter bags to prevent loss of pollution into the atmosphere, of a nature not addressed or resolved in prior art systems.

It is therefore an objective of this invention to provide an improved automatic pollution control system for capping off ruptured baghouse filter bags which resolves these problems and deficiencies of prior art systems.

Other objects, features and advantages of the invention will be found throughout the following description, drawings and claims.

DISCLOSURE OF THE INVENTION

This invention provides a simplified flow detector and flow regulator mechanism, in a baghouse pollution control system, for capping leaking bags in response to pivoting of a flap closure valve member about a pivot axis mounted off center of the flap, wherein the flap is counter weighted on its smallest area side of the pivot axis for biasing it toward a flap open position prior to operation to cap off a failed bag. The critical increase in aerodynamic flow of fluid through an individual bag, when it develops a hole and leaks is sensed by the flap valve causing it to pivot and close with the aid of the counterweight. The detector-capper flap valve member is placed in a housing in the flow path in a substantially laminar flow position, thereby avoiding substantial turbulence along the axis of the elongated filter bags for reliability in action and consistency in performance under a range of operating conditions in the system.

For improving filter life, the improved detector-capper valve may be retrofit or initially installed for example on a thimble assembly for elongating the entranceway to the filter bag in a plenum area, thereby assuring laminar flow at the cuff region, which would otherwise be subjected to abrasion from turbulence and early failure.

The detector-capper valve may be latched in closed position to await failed filter repairs, thus assuring that pollution will not occur in jet pulse cleaned systems by reopening the detector-capper valve. Blow pipes from jet pulse systems are located in the housing and direct flow into the filter bags away from the detector valve flaps, so that reverse flow and vibration do not interfere with the functioning of the protective capping valves.

Further improvements are involved in telemetering closure position for system monitoring, variable adjustability, such as by moving counterweight location, for different flow volumes or velocities, and for partially closing the flow capping valves during startup to limit fluid flow until normal dust caking occurs.

These and further features and advantages of the invention will be described in connection with the accompanying drawings.

BRIEF DESCRIPTION OF THE DRAWINGS

In the accompanying drawings, wherein similar reference characters are used to identify related features throughout the several views:

FIG. 1 is a side sectional view schematic sketch of a typical baghouse filter section introduced into a fluid flow pathway, FIG. 2 is a schematic side view sectional fragmental sketch of a flow sensing and automatic bag capping assembly provided for the individual bags of FIG. 1 in accordance with a preferred embodiment of this invention, FIG. 3 is a diagrammatic sketch of a fluid flow closure valve flap assembly afforded by this invention in a closed position capping off a leaking filter bag.

THE PREFERRED EMBODIMENTS

Figure 5:
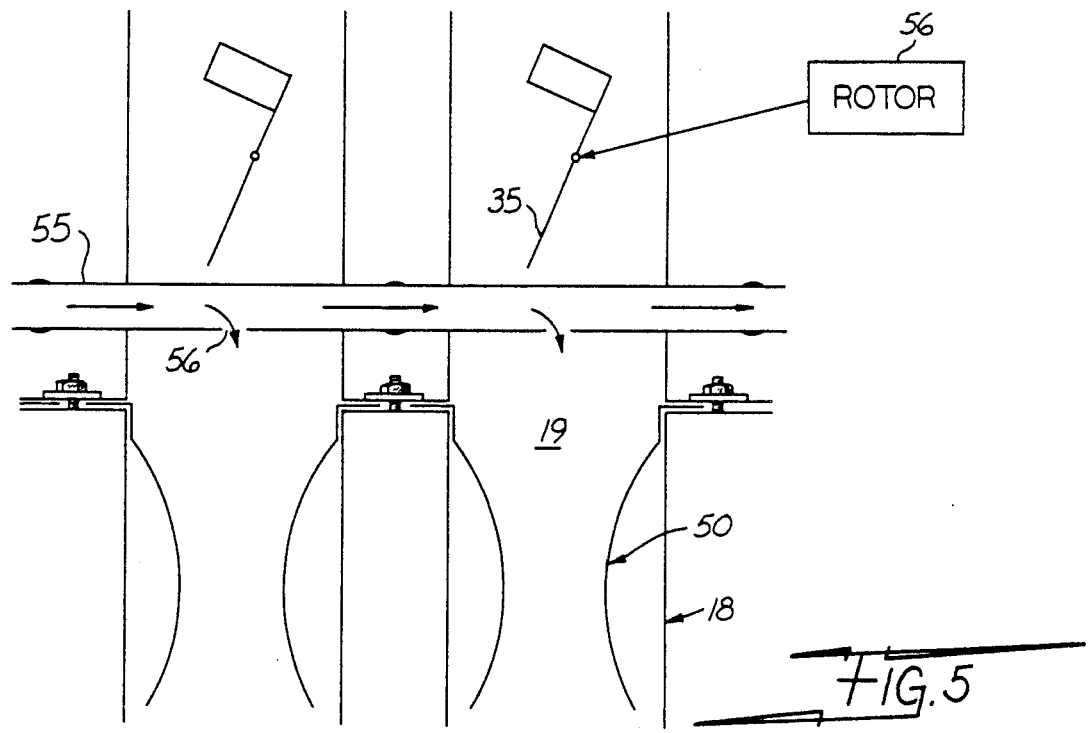
FIG. 5 is a fragmental diagrammatic sketch of a further embodiment of the system used for pollution control baghouse systems of the jet pulse self cleaning variety.

The typical baghouse filtering compartment 10 of FIG. 1 is disposed between entrance flow pipe 15 and exit flow pipe 16 for a fluid, such as air, which contains pollutants to be filtered out before discharge into the atmosphere. The arrows in the plenum 17 indicate the flow of air into the several entranceways 19 of filter bags in the baghouse assembly in which the fabric 18 defines elongated filter bags closed at the top so that the air must flow through the fabric as indicated by the curved arrows pointing toward the open upper flow exit openings 22 out of the baghouse assembly into upper plenum 20. Mounting means 21 is provided for permitting the bags to be shaken to clean out filtered sediment from time to time, letting it drop into the lower plenum area 17.

The automatically operating flow detector-capper valve afforded by this invention is shown in assembly 25 of FIG. 2. Thus, at each entranceway 19 of an individual bag the assembly 25 may be mounted initially or retrofit. This generally cylindrical assembly 25 includes a thimble section, which overlaps the bag entranceway opening and cuff portion 27 of the individual bags. The arrows 29 indicate the flow of air into the filter bag from the lower plenum 17. The shape of the control assembly is such that it tends to stratify air flow upwardly from the entranceway opening 19 as indicated by the arrows 30. The lower mouth 34 of the control assembly 25 defines a throat area which can be capped off to prevent air flow into the individual bag by pivoting of the detector-capper valve flap 35 to thus constitute a flow control valve.

Figure 4:
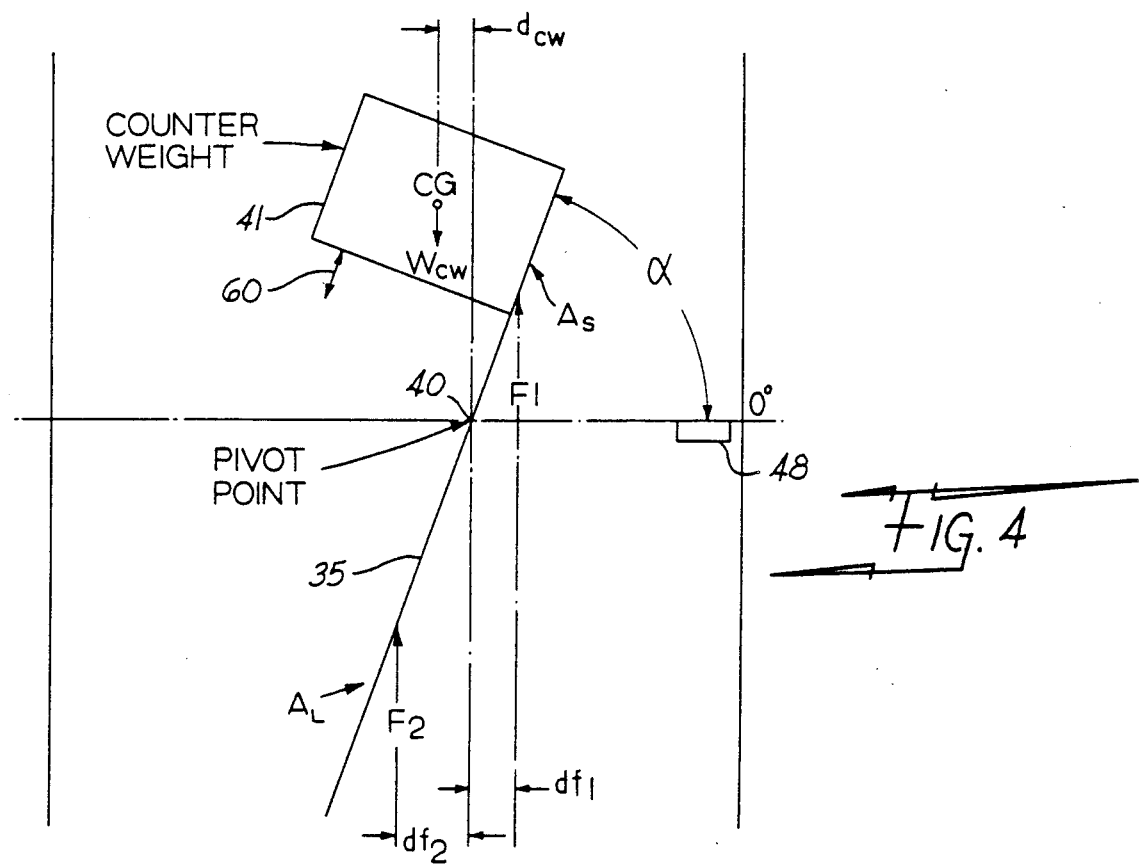
FIG. 4 is a diagrammatic sketch illustrating operating conditions of an open pivoted valve mechanism for sensing abnormal flow conditions and automatically capping off a leaking filter bag provided in accordance with this invention.

This flow control valve assembly operates in a manner better understood by reference to FIGS. 3 and 4. The flap valve plate member is pivoted about a point located off the centerline 39 of the throat 34 and flow control assembly 25 at a pivot axis 40. This provides a very sensitive quickly reacting pivoting of the flap valve 35 when a capping condition is self sensed by the aerodynamic characteristics of the flap valve 35 plate member in the air flow stream.

Since the lower plenum area 17 may be hidden from view, and in the event that remote monitoring of system performance is desired, a microswitch 44, or the like, provides a signal on telemetering lead 45 whenever the flap valve 35 is closed to cap off a bag.

As viewed in FIG. 4, the flap valve 35 plate member is substantially vertically oriented, angle alpha being a few degrees less than ninety, receives the substantially laminar air flow hereinbefore discussed (30) to remain substantially in equilibrium. That is, for the normal range of flow volume or velocity expected through the individual bag, the moment of force created by the laminar flow on the larger area portion to the left of the pivot axis, creates a clockwise force as signified by F2 which is substantially equal to the sum of the counterclockwise moment caused by F1 to the right of the pivot axis, and a counterclockwise moment of force due to the counterweight 41. With no air flow, or with air flow below the operational threshold, the counterweight 41 provides a bias which keeps the flap valve in an open position. With normal flow, the valve will maintain this equilibrium (open) position.

Smaller and larger flap plate 35 areas on opposite sides of the pivot axis 40 are designated respectively $A_S$ and $A_L$. Even a flat plate without special aerodynamic design features therefore will have, at normal flow, substantially equal moments on the two areas. As the flow increases however, the angle alpha becomes smaller because of the larger sail area $A_L$ moment turning the valve plate clockwise. Stop limits at about angle alpha equal to 0 and 80 degrees are provided for the flap valve 35 plate. At angle alpha equal to 80 degrees, the counterclockwise moment created by the counterweight together with the counterclockwise moment (F1) under normal flow conditions, account for normal variations from bag to bag and under day to day operation. When air flow increases above threshold and clockwise rotation starts, the center of gravity of the counterweight is moved to the right of the pivot point and the moment caused by the counterweight 41 then becomes effective to close the valve flap 35 to zero degrees and hold it there by weight of gravity on the counterweight overcoming the fluid flow force on smaller area $A_S$. The critical triggering flow design is that occurring when the bag fabric has developed a hole that produces lower resistance to air flow thereby causing a higher air flow velocity and volume. Thus, the very simple, inexpensive, flap valve 35 system acts not only as a detector of failure but as an automatic bag capper mechanism.

A latching mechanism such as magnet 48 is preferred to keep the sealing plate in closed position in a pulse jet system, where bursts of cleaning air in the opposite direction to the normal air flow could cause the sealing plate to move in a counterclockwise rotation to reopen. If this is an electromagnetic latch, it may be remotely controlled for release upon start up for example when a failed bag has been repaired.

As shown in FIGS. 1 and 5, the sensing and control valve structure 35 may be positioned at the exit openings (22) of the bags 18 in the upper plenum 20, above a venturi restriction insert 50. In such an embodiment, for a pulse jet system, to avoid counter flow and turbulence adversely affecting the control valve operation, a blow pipe 55 for the jet pulses may be provided with exit vents 56 into the top openings 19 of the bags to flow away from the control valves 35.

A suitable mechanism for example a rotor turning source 57 coupled to the valve 35 pivot shaft for partial clockwise rotation to limit flow through the system on start up will tend to limit excessive air flow problems on start up before normal dust caking when only part of the bags are replaced in a system.

The problem of abnormal cuff 27 wear of the fabric in filter bags 18 is also resolved by the embodiment of FIG. 2 wherein the thimble section 26 overlaps the cuff to assure that substantially laminar flow 30 exists. Otherwise, in the plenum 19 or about entranceways to the throat 29 or entrances to bags 19 turbulence tends to whip abrasive particles in the air flow stream into the fabric and cause early failures at that point.

At the time nominal flow rates through existing systems are changed for one reason or another, those changes could ineffectuate the valve control threshold operation. A simple variable adjustment can be made under such circumstances, for example by small movements of the counterweight toward or away from the pivot axis 40 as indicated by the two headed arrow 60 in FIG. 4.

It is therefore evident that improved automatic pollution control systems are provided by this invention. Thus those features of novelty descriptive of the spirit and nature of the invention are described with particularity in the following claims.

I claim:

1. An improved automatic fabric bag filtering network protection system for eliminating pollution to the atmosphere caused by failure of individual filter bags in the network, comprising in combination,
   a plurality of filter bag mounting assemblies arranged in said system to receive a stream of a polluted fluid, such as air, therethrough in parallel at predetermined pressure so that the failure of each filter bag can permit passage of the fluid without filtering and can affect the pressure of the flow in the system by removal of filter resistance,
   individual control valve assemblies controlling the flow of the fluid through individual filter bags arranged in the flow path through the bags for uniformly closing off the flow to filter bags when the flow exceeds a threshold flow magnitude that indicates failure of the filter bag,
   valve assembly means having valving structure comprising a fluid flow closure flap with a plate member pivotable about a pivot axis located off center in the plate member, and
   mounting means placing the closure flap within an isolated fluid flow path for an individual bag in a position avoiding substantial turbulence so that the plate responds to the fluid flow as a pivoting force to close the flow path in response to flow rates in said bag of a magnitude exceeding said threshold flow.

2. The system of claim 1 wherein the plate member has smaller and larger areas defined on opposite sides of the pivot axis, and counterweight means are disposed on the smaller areas in a position to maintain an open position during normal flow and for closure of the flow path in part by the force of gravity on the counterweight means when operational threshold is exceeded.

3. The system of claim 1 wherein the filter bags comprise vertically oriented substantially cylindrical members receiving a flow of said fluid from an input plenum below opening orifices of the bags, and wherein said mounting means further comprises, protective cylindrical thimble means in which the plate members are pivoted extending downwardly from cuffed orifices of the bags into the plenum to prevent the initial flow of air from the plenum into the bags from impacting the lower cuff area of the bags.

4. The system of claim 1 further comprising viewable indicators for signifying closed valves in the flow paths thereby indicating failed bags in the system network.

5. The system of claim 1 further comprising latching means on said valve assemblies to retain them in closed condition for awaiting bag repairs.

6. The system of claim 1 wherein the filter bags are substantially vertically oriented with an upper fluid exit orifice further comprising jet pulse means for reversing the fluid flow path through the filter bags, blow pipe means for directing the jet pulse fluid flow into individual bags at a position near the fluid exit orifice, and said mounting structure positions the pivotable closure flap at a flow path position above the fluid exit orifice from the filter bags.

7. The system of claim 1 further comprising variably adjustable means for changing the flow rate magnitude for closing the flow path.

8. The system of claim 7 wherein said variably adjustable means comprises a counterweight carried by said plate member at a position removed from the pivot axis of the plate member.

9. The system of claim 1 further comprising means for limiting fluid flow through a new filter bag assembly during start up.

10. The system of claim 9 wherein said means for limiting fluid flow comprises means for holding said plate members in a partially closed position to limit fluid flow during start up.

11. The method of decreasing air pollution discharge from fluid flow filtering systems using a network of bag filters subject to failure to permit discharge of unfiltered fluid, comprising the steps of:
    installing valves for preventing fluid flow through individual bag filters at positions in fluid flow paths for the individual filters substantially devoid of turbulence,
    constructing said valves to close said fluid flow paths of individual filters,
    pivoting a valve closure member in each of said valves to move toward closure of the fluid flow paths aerodynamically in response to the magnitude of fluid flow in said paths exceeding a predetermined threshold indicative of failure of the bag filters in the paths, and
    biasing the valve closure member to fully close the fluid flow path in response to movement toward closure caused in the preceding step.

12. The method of claim 11 wherein the biasing step is achieved by counterweighing valve closure members comprising a substantially flat plate member pivotablly mounted on an off center pivot axis on a smaller area side of the plate removed from the pivot axis.

13. The method of claim 11 further comprising the step of partially closing the valve closure means of a plurality of the valve closure means during start up with new filter bags to limit the initial fluid flow magnitude through the bags.

14. The method of claim 11 further comprising the step of variably adjusting the aerodynamic response of the valve closure member in each valve closure means for response to a predetermined magnitude of fluid flow.

15. The method of claim 11, wherein the filter bags comprise substantially cylindrical longitudinally disposed fabric members having an inlet fluid flow cuff area, further comprising the step of protecting the cuff area from turbulence in the fluid flow path.

16. The method of claim 11 further comprising the step of telemetering to a common remote location an indication of those valve members in position for closing a fluid flow path.

17. The method of claim 11 further comprising the step of flowing fluid through said filter bags in a reverse direction through a path avoiding flow through said valves.

* * * * *